(No Model.)
J. H. PURDY & C. T. WELCH.
SEEDING MACHINE.
No. 288,661. Patented Nov. 20, 1883.
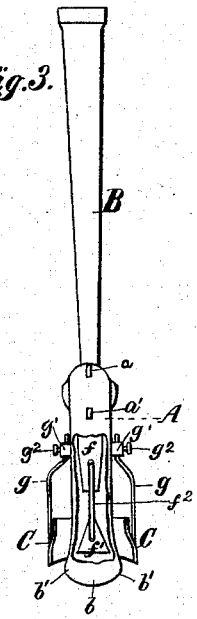
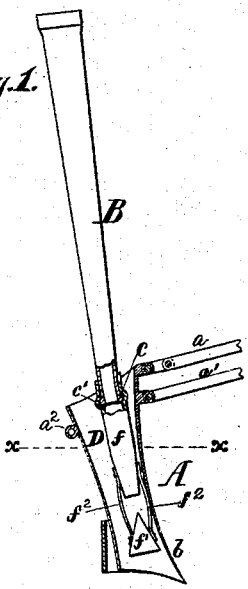
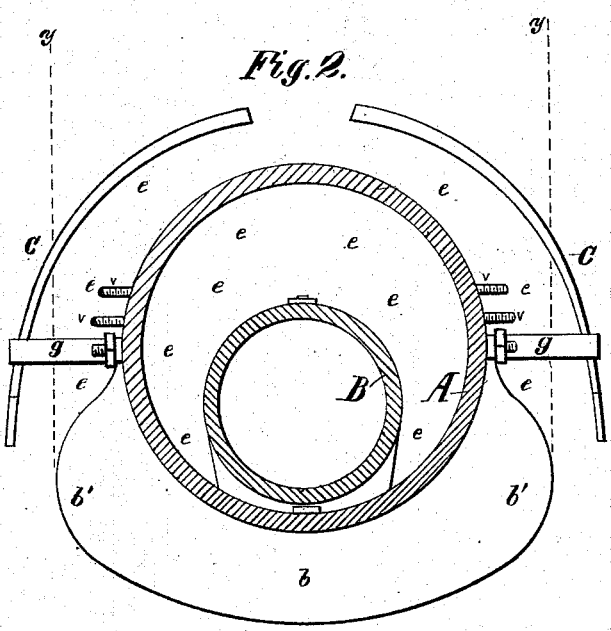
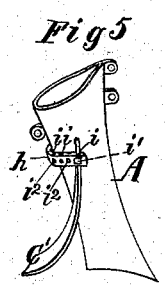
Witnesses:
B. C. Fenwick.
Robt. L. Fenwick.
Inventor:
James H. Purdy
Charles T. Welch
by their attys
Fenwick & Lawrence

UNITED STATES PATENT OFFICE.

JAMES H. PURDY AND CHARLES T. WELCH, OF BELLONA, NEW YORK.

SEEDING-MACHINE.

SPECIFICATION forming part of Letters Patent No. 289,661, dated November 20, 1883.

Application filed February 20, 1883. (No model.)

*To all whom it may concern:*

Be it known that we, JAMES H. PURDY and CHARLES T. WELCH, citizens of the United States, residing at or near Bellona, in the county of Yates and State of New York, have invented a new and useful Improvement in Seeding-Machines; and we do hereby declare that the following is a full, clear, and exact description thereof, reference being had to the accompanying drawings and letters of reference marked thereon, forming a part of this our specification of said improvement, in which drawings—

Figure 1 is a vertical central longitudinal section, from front to rear, of a "boot" of a seeding-machine, and having in working position, in connection therewith, a rubber or flexible seed-delivery tube provided at its lower end with a seed-scatterer, the rubber tube and the scatterer being represented partly in section and partly in elevation. Fig. 2 is an enlarged view of the same, partly in cross-section, on line $x$ $x$ of Fig. 1, and partly in plan view. Fig. 3 is a front elevation of Fig. 1, with a portion of the front of the boot broken away, so as to expose to view a part of the "scatterer;" and Fig. 4 is a detached view of the rubber seed-delivery tube with scatterer attached, a part of each being shown in elevation as well as in section.

Our improvement relates to that class of seeding-machines in which are employed a number of drills or boots arranged in "rank," through which the seed from the hopper passes on its way to the ground; but as ordinarily constructed these drills or boots, at their lower ends, have working-points so made as to form, when in operation, a V-shaped gutter or trench in the earth, and into the bottom or angle of which trench the seed is deposited in a massed condition, even though a scatterer be provided in the boot. This massed condition—of wheat, for example—when sown by the ordinary "seed-drill," is subject to the objection, among others, that the "stands" of the grain are huddled together and do not properly develop, and in case a fertilizer be sown with the wheat, and a dry hot season ensues, the fertilizer itself contributes to injure the growing grain, since it was, with the grain, concentrated in the V-shaped trenches. In other words, when so planted, the growing grain does not receive its full proper nourishment from the earth, becomes more or less stunted, and consequent loss in production ensues.

It is the object of our invention to overcome these objections in the cultivation of wheat and other grain; and to this end we employ a boot so constructed that when in operation on a seeding-machine it will form within the compass of its lower end a broad flat path under the surface of the ground, upon which the seed being sown will be scattered as the boot moves forward, a scatterer being employed, in connection with the boot, at the lower end of a rubber tube, which leads the grain down from the hopper of the seeding-machine into the boot.

In the drawings, A indicates a boot of a seeding-machine, adapted at its upper end to be attached to drag-bars $a$ $a'$ of such machines, and with an eye-lug, $a^2$, on its rear upper portion, to which to apply a chain for elevating the boot when not in action, as indicated in Fig. 1. The front working end of this boot is made to slope down, as at $b$ in Fig. 1, while sloping portions, as at $b'$ $b'$, extend laterally a considerable distance on either side of the front portion, $b$, the distance of the slope from $b'$ to $b'$, as shown in Fig. 2, being such as will form in the ground, when the boot is in action, the desired width of track or path upon which to scatter the grain being sown, the width of such track which would be made by a boot of the size of Fig. 2 being indicated between the dotted lines $y$ $y$.

Having reference to Fig. 1, B is a rubber tube, which in practice may have its upper end secured to a cross-bar of a seeding-machine, beneath the seed-hopper of the machine, and thus be held suspended in working position, as shown, while seed from the hopper is passed down through it into the boot A. The lower end of this tube, as shown, is made with a circular bead, $c$, which is forced down into the interior of a beaded portion, $c'$, of a seed-scatterer, D, and thus the scatterer is retained in place upon the rubber tube B within the boot A.

The seed-scatterer D is composed of a metal tube, $f$, which has its lower end centrally over the apex of a cone, $f'$, the tube $f$ and cone $f'$ being held in relative position by short bars, as at $f^2 f^2$, while the upper end of the tube $f$ is provided with the bead $c'$. into which the beaded end of the rubber tube B is made to seat itself, as before stated.

On both sides of the boot A we apply a coverer, C, the office of which is to cause the earth, when the boot is in use, to pass between the body of the boot and the respective covers, and deposit itself over the grain in the broad flat track made by the forward and laterally sloping portions $b' b b'$ of the boot. The coverers C are secured to flat springy pieces of metal $g$, which at their upper ends may be adjusted up and down in suitable ways, $g'$, projecting from either side of the boot, and held in any desired position by screws $g^2$, as indicated in Fig. 3, and thus said coverers may be made to cover the grain with more or less depth of earth, as desired.

In Fig. 2 the springy pieces of metal $g$ are shown held in position by clamping-nut and screw.

By reference to Fig. 2 it will be seen that the coverers C C, at their front ends, extend considerably forward of the longitudinal axis of the boot, and on a curve sweep around in rear of the boot A a sufficient distance to insure a proper deposit of the earth upon the grain throughout the whole width of the track shown between the dotted lines $y y$.

In operation, the boot A being moved forward in the direction of the arrow, the working lower portion of the boot enters the ground, thereby plowing up the earth in front and forming beneath the boot a broad flat track, as signified by the letter $e$, between the dotted lines $y y$, while at the same time the seed being sown passes down from the hopper of the seeding-machine, to which our boot may be applied, into and through the rubber tube B; thence on through the tube $f$, and, falling upon the cone $f'$, is scattered over the track $e$ made by the boot, and as the machine goes forward the grain is covered with earth by the coverers C, the earth being forced by the forward movement of the machine between the body of the boot A and the coverers C, the springs $g g$ yielding laterally to accommodate the passage of the earth from front to rear of the boot. As the coverers C have their front edges extending forward of the rear portion of the sloping portions $b'$ of the boot, the earth plowed will pass off from $b' b'$ to a position between the body of the boot and said coverers, and so insure a return of the earth upon the grain on track $e$ by the coverers.

In seeding-machines now in use, which employ a boot having a scatterer constructed as a fixture of the boot, inside thereof, the objection obtains that in case they become clogged with earth in the act of use, or in any other manner, it is difficult and troublesome to manipulate the boot in order to remove the obstruction, and besides this, it is more expensive to construct a boot with a scatterer attached interiorly thereto than when provided upon a flexible tube, as B; and if, as provided by us, the scatterer should become clogged while working in the field, the tube B can be readily withdrawn from the boot and separated at the joint $c c'$ and the obstruction removed and then as readily be again replaced in working-position, as signified in Fig. 1.

As shown in Fig. 2, the boot A is provided with extra screw-bolts, as $v$, to which the coverers, as C, may be applied, and thus make their rear portion meet, or nearly so, in rear of the boot, when for covering purposes the same is desirable. The boot A may be provided, as indicated in Fig. 5, with a block, $h$, extending half-way round the boot, as shown, and having vertical holes $i$ extending through it. into which the shank of coverers may be inserted and adjusted and held in desired position by screw-bolts $i'$, engaging with horizontal screw-holes $i^2$, and thus coverers, as C', (shown in Fig. 5,) be made to work nearer together or farther apart, as circumstances may require, the coverers C' being made of springy metal, and curved, as shown, in order to shed grass and trash.

What we claim as our invention, and desire to secure by Letters Patent, is—

1. A scatterer, D, applied upon and held pendent within a boot by a flexible seed-conducting tube, B, substantially as described.

2. The combination of the flexible seed-conducting tube B, scatterer D, and boot A, substantially as and for the purpose set forth.

JAMES H. PURDY.
CHARLES T. WELCH.

Witnesses:
ALVA KETCHAM,
JAMES A. GARRISON.